US012125429B2

(12) United States Patent
Kim et al.

(10) Patent No.: US 12,125,429 B2
(45) Date of Patent: Oct. 22, 2024

(54) DISPLAY DEVICE AND CONTROL METHOD THEREOF

(71) Applicant: SAMSUNG ELECTRONICS CO., LTD., Suwon-si (KR)

(72) Inventors: Taeho Kim, Suwon-si (KR); Sangkyun Im, Suwon-si (KR); Minhoon Lee, Suwon-si (KR); Joowhan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/070,972

(22) Filed: Nov. 29, 2022

(65) Prior Publication Data

US 2023/0146402 A1 May 11, 2023

Related U.S. Application Data

(63) Continuation of application No. PCT/KR2021/005013, filed on Apr. 21, 2021.

(30) Foreign Application Priority Data

Jun. 12, 2020 (KR) ........................ 10-2020-0071872
Oct. 27, 2020 (KR) ........................ 10-2020-0140674

(51) Int. Cl.
*G09G 3/32* (2016.01)
*G09G 3/20* (2006.01)

(52) U.S. Cl.
CPC ............ *G09G 3/32* (2013.01); *G09G 3/2096* (2013.01); *G09G 2330/021* (2013.01); *G09G 2370/14* (2013.01)

(58) Field of Classification Search
CPC .. G09G 3/32; G09G 3/2096; G09G 2330/021; G09G 2370/14
See application file for complete search history.

(56) References Cited

U.S. PATENT DOCUMENTS 7,768,476 B2 8/2010 Han
8,207,954 B2 6/2012 Cok et al.
(Continued)

FOREIGN PATENT DOCUMENTS

KR 10-0667111 B1 1/2007
KR 10-2008-0058605 A 6/2008
(Continued)

OTHER PUBLICATIONS

Communication dated Jan. 21, 2022, issued by the Korean Intellectual Property Office in Korean Patent Application No. 10-2020-0140674.

(Continued)

*Primary Examiner* — Matthew A Eason
*Assistant Examiner* — Sujit Shah
(74) *Attorney, Agent, or Firm* — Sughrue Mion, PLLC

(57) ABSTRACT

Disclosed is a display device and a method for controlling a device. The display device includes a plurality of light emitting diode (LED) modules arranged in a matrix, a plurality of driver integrated circuits (ICs) configured to drive the plurality of LED modules, and a controller connected to a plurality of first line driver ICs arranged on a first line, among the plurality of driver ICs, and configured to provide a signal for controlling the plurality of driver ICs through the plurality of first line driver ICs arranged on the first line. Each of the plurality of driver ICs is connected to at least one adjacent driver IC. The signal for controlling each of the plurality of driver ICs comprises, for each LED module corresponding to each of the plurality of driver ICs, a channel signal for controlling each channel of the LED module, and a scan signal for controlling each scan line of the LED module.

11 Claims, 10 Drawing Sheets

(56) References Cited

U.S. PATENT DOCUMENTS

| | | | | |
|---|---|---|---|---|
| 11,074,852 | B2 | 7/2021 | Hyeon | |
| 11,282,445 | B2 | 3/2022 | Yeo et al. | |
| 2010/0201610 | A1 | 8/2010 | Lo et al. | |
| 2010/0302129 | A1* | 12/2010 | Kastrup | G06F 3/1446 345/1.3 |
| 2012/0319926 | A1* | 12/2012 | Koebrich | G09G 3/14 345/1.3 |
| 2013/0181884 | A1* | 7/2013 | Perkins | G09F 9/3026 345/1.3 |
| 2017/0098404 | A1 | 4/2017 | Lee et al. | |
| 2019/0384559 | A1 | 12/2019 | Kim et al. | |
| 2020/0081679 | A1 | 3/2020 | Im et al. | |
| 2020/0118498 | A1 | 4/2020 | Lee et al. | |
| 2020/0211447 | A1* | 7/2020 | Mays | G09G 3/32 |
| 2020/0225903 | A1* | 7/2020 | Cohen | G09G 5/12 |

FOREIGN PATENT DOCUMENTS

| | | | |
|---|---|---|---|
| KR | 10-2008-0085592 | A | 9/2008 |
| KR | 10-2011-0082137 | A | 7/2011 |
| KR | 10-2011-0098912 | A | 9/2011 |
| KR | 10-2017-0039438 | A | 4/2017 |
| KR | 10-2020-0025880 | A | 3/2020 |
| KR | 10-2020-0028142 | A | 3/2020 |
| KR | 10-2020-0030183 | A | 3/2020 |
| KR | 10-2020-0040600 | A | 4/2020 |
| KR | 10-2022-0000760 | A | 1/2022 |

OTHER PUBLICATIONS

Communication dated Aug. 17, 2021, issued by the International Searching Authority in counterpart International Application No. PCT/KR2021/005013 (PCT/ISA/210 and PCT/ISA/237).

* cited by examiner

Driver IC Memory

| Address | 0 | 1 | 2 | 3 | 4 | 5 | 354 | 355 | 356 | 357 | 358 | 359 |
|---|---|---|---|---|---|---|---|---|---|---|---|---|
| SCAN0 | R0,0 | G0,0 | B0,0 | R1,0 | G1,0 | B1,0 | R118,0 | G118,0 | B118,0 | R119,0 | G119,0 | B119,0 |
| SCAN1 | R0,1 | G0,1 | B0,1 | R1,1 | G1,1 | B1,1 | R118,1 | G118,1 | B118,1 | R119,1 | G119,1 | B119,1 |

DISPLAY DEVICE AND CONTROL METHOD THEREOF

CROSS-REFERENCE TO RELATED APPLICATIONS

This application is a bypass continuation application of International Application No. PCT/KR2021/005013, filed on Apr. 21, 2021, which is based on and claims priority to Korean Patent Application No. 10-2020-0071872, filed on Jun. 12, 2020, and Korean Patent Application No. 10-2020-0140674, filed on Oct. 27, 2020, in the Korean Intellectual Property Office, the disclosures of which are incorporated by reference herein in their entireties.

BACKGROUND

1. Field

The disclosure relates to a display device and a control method thereof, and more particularly, to a display device displaying content through a plurality of driver ICs and a control method thereof.

2. Description of Related Art

A light emitting diode (LED) passive matrix (PM) driving type display device of the related art includes a plurality of LED modules as shown in FIG. 1A. Each of the plurality of LED modules may be driven by a plurality of driver integrated circuits (ICs).

As shown in FIG. 1B, each driver IC includes a channel (CH) and a scan line, and may drive each LED. A channel refers to a current source, and a scan line refers to a time division function.

The driver IC of the related art is implemented to drive 48CH×32SCAN, and an external input interface is implemented as a serial peripheral interface (SPI) having a maximum data rate of 25 Mbps. In order to implement 4K resolution with the driver IC of the related art, 17,280 driver ICs are required, and in order to implement 4K 120 Hz with SPI, at least 250 SPI connections are required.

In addition, a size of the driver IC of the related art is generally 8×8 mm to 10×10 mm, and if the LED spacing is 0.84 mm or less, the size of the driver IC is larger than the 48×32 LED spacings, and thus, PCB mounting is impractical. In other words, the driver IC of the related art cannot be used for a very small pitch to which μLED/mini-LED is applied.

As described above, in case of implementing a large screen using the driver IC of the related art, a large number of driver ICs are required, and thus, power consumption and material costs increase, system complexity increases due to an increase in SPI interfaces, and it is impractical to implement a product with a small pitch between LEDs.

SUMMARY

Provided are a display device having an interface more suitable for a large screen using a driver IC of a new standard and a control method thereof.

Additional aspects will be set forth in part in the description which follows and, in part, will be apparent from the description, or may be learned by practice of the presented embodiments.

According to an aspect of the disclosure, there is provided a display device including a plurality of light emitting diode (LED) modules arranged in a matrix; a plurality of driver integrated circuits (ICs) configured to drive the plurality of LED modules; and a controller connected to a plurality of first line driver ICs arranged on a first line, among the plurality of driver ICs, and configured to provide a signal for controlling the plurality of driver ICs through the plurality of first line driver ICs. Each of the plurality of driver ICs may be connected to at least one adjacent driver IC. The signal for controlling the plurality of driver ICs may comprise, for each LED module corresponding to each of the plurality of driver ICs, a channel signal for controlling each channel of the LED module, and a scan signal for controlling each scan line of the LED module.

According to another aspect of the disclosure, there is provided a method of controlling a display device including: providing a signal for controlling a plurality of driver integrated circuits (ICs) arranged in a matrix through a plurality of first line driver ICs arranged on a first line by a controller connected to the plurality of first line driver ICs; and controlling each of a plurality of light emitting diode (LED) modules based on a control signal respectively received by a corresponding one of the plurality of driver ICs. Each of the plurality of driver ICs may be connected to at least one adjacent driver IC. The signal for controlling the plurality of driver ICs may comprise, for each LED module corresponding to each of the plurality of driver ICs, a channel signal for controlling each channel of an LED module, and a scan signal for controlling each scan line of the LED module.

According to various embodiments of the disclosure as described above, as a display device uses a driver IC having a high-speed interface, the number and connection of driver ICs may be minimized to reduce material costs.

In addition, the controller of the display device is connected to only a portion of the driver IC to provide a control signal, and the control signal is sequentially provided to other driver ICs, thereby further reducing the size of the display device.

In addition, as a driver IC having a high-speed interface is used, the number of LEDs that may be managed by one driver IC increases, making it possible to implement a product with a small pitch between LEDs.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, example embodiments of the disclosure will be described in detail with reference to the accompanying drawings.

The terms used in the example embodiments of the disclosure are general terms which are widely used now and selected considering the functions of the disclosure. However, the terms may vary depending on the intention of a person skilled in the art, a precedent, or the advent of new technology. In addition, in a specified case, the term may be arbitrarily selected. In this case, the meaning of the term will be explained in the corresponding description. Therefore, terms used in the disclosure may be defined based on a meaning of the terms and contents described in the disclosure, not simply based on names of the terms.

As used herein, the expression “have”, “may have”, “include”, or “may include” refers to the existence of a corresponding feature (e.g., numeral, function, operation, or constituent element such as component), and does not exclude one or more additional features.

The expression of “at least one of A and/or B” is to be understood as indicating any one of “A” or “B” or “A and B”.

As used herein, expressions such as “first,” “second,” “first,” or “second,” may modify various elements, regardless of order and/or importance, and are used to distinguish a component from other components, without limiting the components.

The expression “a first”, “a second”, “the first”, or “the second” used in various example embodiments of the disclosure may modify various components regardless of their order and/or the importance but does not limit the corresponding components.

A singular expression includes a plural expression as long as they are clearly distinguished in the context. In the application, it should be understood that the terms such as “comprising”, “including” are intended to express that features, numbers, steps, operations, constituent elements, part, or combinations thereof described in the specification are present and do not exclude existence or additions of one or more other features, numbers, steps, operations, constituent elements, part, or combinations thereof.

In this disclosure, the term “user” may indicate a person who uses a display device or a device (e.g., an artificial intelligence electronic device) that uses a display device.

An embodiment of the disclosure will be described in detail with reference to the accompanying drawings.

Figure 1A:
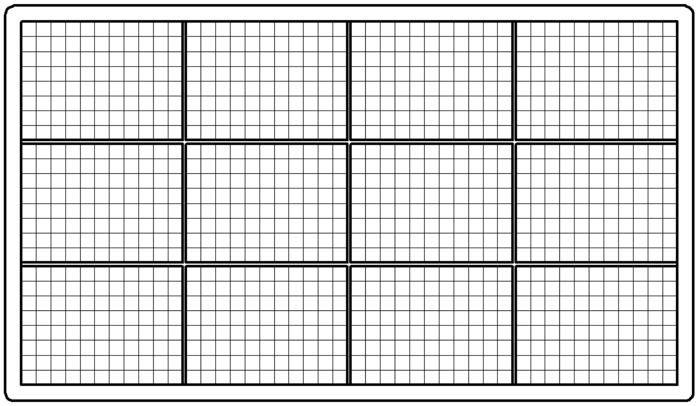
FIGS. 1A and 1B are views illustrating the problems of the related art.
Figure 1B:
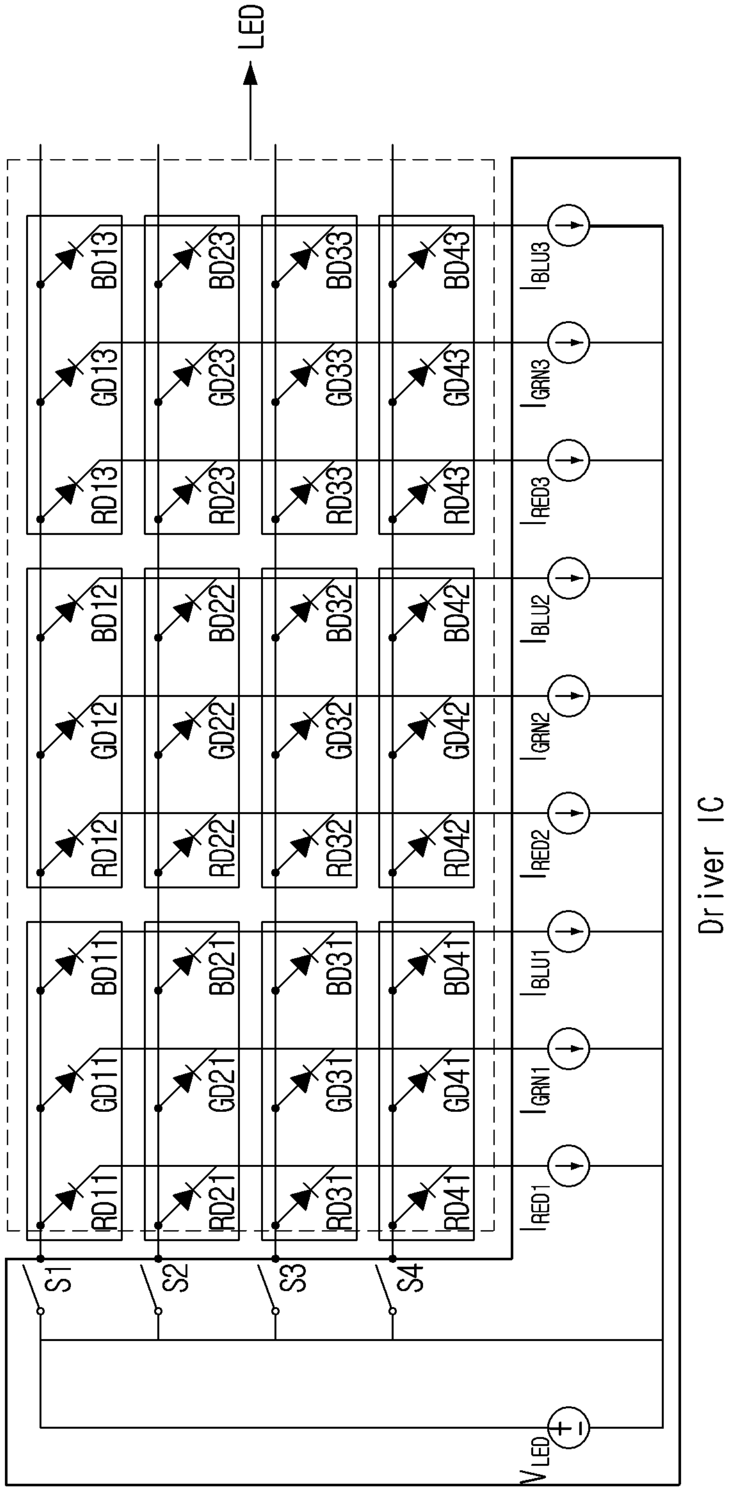
Figure 2:
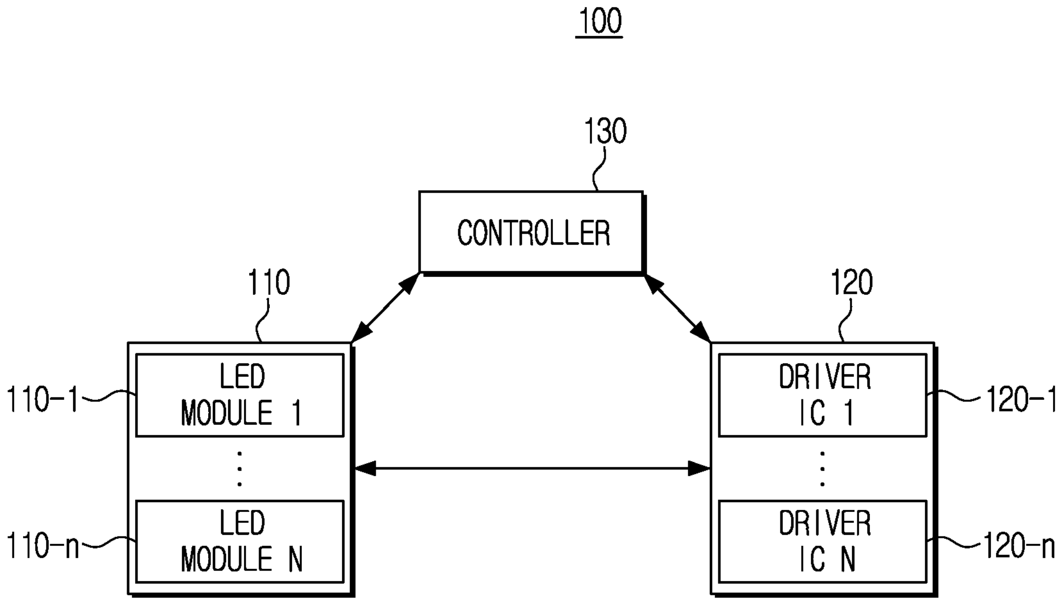
FIG. 2 is a block diagram illustrating a configuration of a display device according to an embodiment of the disclosure.

FIG. 2 is a block diagram illustrating a configuration of a display device 100 according to an embodiment of the disclosure.

The display device 100 is a device that displays content, may include a TV, a desktop PC, a notebook computer, a video wall, a large format display (LFD), a digital signage, a digital information display (DID), a projector display, a DVD (digital video disk) player, a refrigerator, a washing machine, a smartphone, a tablet PC, a monitor, smart glasses, a smart watch, and the like, and may be any device capable of displaying content.

According to FIG. 2, the display device 100 includes a plurality of light emitting diode (LED) modules 110, a plurality of driver integrated circuits (ICs) 120, and a controller 130. However, the disclosure is not limited thereto, and the display device 100 may be implemented in a form in which some components are excluded, or in a form in which other components are further included.

The display device 100 may be implemented in a form in which a plurality of LED modules 110 are physically connected to each other. In particular, the plurality of LED modules 110 may be arranged in a matrix form to form the display device 100. Each of the plurality of LED modules 110 may include a plurality of pixels arranged in a matrix form. A plurality of pixels may be implemented as an LED device. For example, the LED module may be implemented as an LED, a micro LED, an organic LED (OLED), a passive-matrix OLED (PMOLED), or the like. Each pixel may be implemented as an RGB LED, and the RGB LED may include a RED LED, a GREEN LED, and a BLUE LED. In addition, the LED device may be implemented as a micro LED. Here, the micro LED is an LED having a size of about 5 to 100 micrometers, and is an ultra-small light emitting device that emits light by itself without a color filter.

Each of the plurality of LED modules 110 copies the image data received from the controller 130 to be described later, stores the image data in an internal buffer, and then outputs the image data, and the image data may be fed back to the controller 130 through a plurality of LED modules 110.

The plurality of LED modules 110 may include more pixels than the related art. This is because a plurality of driver ICs 120 to be described later have a high-speed interface. For example, each of the plurality of LED modules 110 may include one hundred and twenty (120) or more channels and sixty (60) or more scan lines. However, the disclosure is not limited thereto, and the LED modules may be implemented in various shapes and in various numbers as long as the LED modules may include more pixels than the related art.

The plurality of driver ICs 120 may respectively drive the plurality of LED modules 110 under the control of the controller 130. For example, the plurality of driver ICs 120 may apply a driving voltage or cause a driving current to flow to drive each light emitting device constituting the plurality of LED modules 110, for example, LED pixels, under the control of the controller 130. In this case, the plurality of driver ICs 120 may adjust at least one of a supply time or intensity of the driving current supplied to the plurality of LED modules 110 to correspond to each control signal input from the controller 130.

Each of the plurality of driver ICs 120 may include a power supply for supplying power. The power supply is hardware that converts alternating current (AC) into direct current (DC) to supply power for each system so that power may be used stably in the plurality of LED modules 110.

Here, the power supply may be implemented as, for example, a switched mode power supply (SMPS). The SMPS is a DC-stabilized power supply device stabilizing an output by controlling an on-off time ratio of a semiconductor switch element and may be used to drive a plurality of LED modules 110 due to high efficiency, small size, and light weight thereof.

Alternatively, the plurality of driver ICs 120 may be implemented in the form of one driving module that separately drives a plurality of SMPSs supplying power to the plurality of LED modules 110.

Each of the plurality of driver ICs 120 may include at least one interface, among mini LVDS, LVDS, VbyOne, SerDes, and USI-T. That is, each of the plurality of driver ICs 120 may include a higher-speed interface than the related art, and thus the number of pixels of each of the plurality of LED modules may be increased, while reducing connection with a controller, compared with the related art.

Each of the plurality of driver ICs 120 may be connected to at least one adjacent driver IC. For example, an upper left driver IC may be connected to a right driver IC and a lower driver IC. Also, some of the plurality of driver ICs 120 may be connected to a driver IC adjacent in a diagonal direction. This will be described with reference to FIG. 5.

The controller 130 may acquire image data corresponding to each of the plurality of LED modules 110 based on an input image signal. Here, the input image signal may be a signal for input image information. The image data includes data related to an image to be displayed on each of the plurality of LED modules 110, and may include, for example, pixel values and luminance information of each LED element.

The controller 130 may be connected to a plurality of driver ICs arranged on the first line (e.g. "first line driver ICs"), among the plurality of driver ICs 120, and may provide a signal for controlling a plurality of driver ICs 120 through the plurality of first line driver ICs. That is, the controller 130, rather than being directly connected to all of the plurality of driver ICs 120, may be specifically connected to one or more first line driver ICs. Here, the signal for controlling the plurality of driver ICs 120 may be a signal for image data. In particular, the signal for controlling each of the plurality of driver ICs may include a channel signal for controlling each channel of the LED module, each channel respectively corresponding to each of the plurality of driver ICs, and a scan signal for controlling each scan line of the LED module, each scan line respectively corresponding to each of the plurality of driver ICs.

For example, the controller 130 may be implemented as a time controller (TCON) that receives an input image signal and provides the received image signal to a plurality of driver ICs arranged on the first line. Here, the signal provided to the plurality of driver ICs arranged on the first line may include not only a signal for controlling a plurality of driver ICs arranged on the first line but also a signal for controlling a plurality of driver ICs arranged on the remaining lines (e.g. "remaining line driver ICs"). Signals for controlling a plurality of driver ICs arranged on the remaining lines from some of the plurality of driver ICs arranged on the first line may be sequentially transmitted to the plurality of driver ICs arranged on the remaining lines. The plurality of driver ICs 120 may drive each LED pixel by applying a driving voltage or causing a driving current to flow to drive the LED pixel based on a signal corresponding thereto.

In order to describe the above operation in more detail, it is assumed that a plurality of LED modules 110 are arranged in a matrix form of m×n, and a plurality of driver ICs 120 are respectively arranged on the rear of the plurality of LED modules 110.

The controller 130 may provide a plurality of control signals for controlling a plurality of driver ICs arranged on a plurality of lines, including a first line, to a first driver IC among a plurality of first driver ICs arranged on the first line. For example, assuming that the first line is the topmost, the controller 130 may be connected to n driver ICs arranged in the topmost first row, and provide a plurality of control signals for controlling the driver ICs arranged on the first to third rows to a first driver IC disposed in a first column, among n driver ICs arranged on the first row. However, the disclosure is not limited thereto, and the "first line" may be defined according to a variety of different positions. For example, the first line may refer to a first column on the left, and in this case, the controller 130 may be connected to m driver ICs arranged in a first column on the left, and may provide a plurality of control signals for controlling the driver ICs arranged in the first to third rows to the first driver IC disposed in the first row, among the m driver ICs arranged in the first column.

The first driver IC may provide the remaining signals, excluding a first control signal for controlling the first line, among the plurality of control signals, to a second driver IC adjacent to the first driver IC on a second line next to the first line, among the plurality of lines. In the example described above, the first driver IC may provide the remaining signals, among the plurality of control signals, to the second driver IC disposed in a first column of a second row.

In addition, the first driver IC may control an LED module corresponding to the first driver IC based on a control signal corresponding to the first driver IC, among the first control signals, and provide the remaining signals, among the first control signals, from the first line to the third driver IC adjacent to the first driver IC on the first line. In the example described above, the first driver IC may provide the remaining signals, among the first control signals, to the third driver IC disposed in a second column of the first row.

Similarly, the third driver IC may control an LED module corresponding to the third driver IC based on a control signal corresponding to the received signal, and may provide the remaining signal to a driver IC in the next column. That is, the driver ICs in each column may use the corresponding control signal and provide the remaining signals to the driver ICs in the next column, and the driver ICs in an n-th column may provide a feedback signal to the controller 130. That is, the controller 130 may receive a feedback signal from one of a plurality of driver ICs arranged on the first line. The feedback signal may include at least one of error information, temperature information, or voltage information of the LED device.

The controller 130 may provide a plurality of control signals for controlling a plurality of driver ICs arranged on a plurality of lines not including the first line to a third driver IC, among a plurality of driver ICs arranged on the first line. In the example described above, the controller 130 may provide a plurality of control signals for controlling the driver ICs arranged in fourth to sixth rows, to a third driver IC disposed in a second column, among n driver ICs arranged in the first row.

The plurality of control signals may be sequentially provided from the third driver IC to at least some of the remaining lines, and while being sequentially provided, the plurality of control signals may be provided to a fourth driver IC corresponding to the third driver IC or a fifth driver IC adjacent to the fourth driver IC on the same line as the fourth driver IC based on the number (that is, the quantity) of the plurality of control signals. When the fifth driver IC is disposed at a position corresponding to the first driver IC, the fifth driver IC controls the LED module corresponding to the fifth driver IC based on a control signal corresponding to the fifth driver IC, among a plurality of control signals, and, when the fifth driver IC is not disposed at the position corresponding to the first driver IC, a plurality of control signals may be provided to a driver IC corresponding to the fifth driver IC on a line next to the line in which the fifth driver IC is included.

In the example described above, the third driver IC may provide a plurality of control signals to a driver IC in a first column of a fourth row through a driver IC in a second column of a second row and a driver IC in a second column of a third row. Because the driver IC in the first column of the fourth row operates in the same manner as the first driver IC, a redundant description will be omitted.

For the understanding of the disclosure, the operation of the driver IC in the third column of the first row is further described. In the above example, the controller 130 may provide a plurality of control signals for controlling driver ICs arranged in seventh to ninth rows to the driver IC arranged in the third column, among n driver ICs arranged in the first row.

The driver ICs in the third column of the first row may provide a plurality of control signals to the driver ICs in the second column of the fourth row through the driver ICs in the third column of the second row and the driver ICs in the third column of the third row.

The driver ICs in the second column of the fourth row may provide a plurality of control signals to the driver ICs in a first column of a seventh row through driver ICs in a second column of the fifth row and driver ICs in a second column of the sixth row. The driver ICs in the first column of the seventh row operate in the same manner as the first driver IC, and thus, a redundant description will be omitted.

The above operation is because the plurality of driver ICs transmit data through the high-speed interface. Accordingly, the controller 130 may provide control signals for the remaining driver ICs even if the controller 130 is connected only to the driver ICs arranged on the first line, among the plurality of driver ICs. In addition, because the connections are minimized, the size may be reduced and material costs may be reduced.

Although it has been described above that signals for controlling the driver ICs arranged in three rows are provided through the driver ICs arranged in one column, the disclosure is not limited thereto. For example, signals for controlling driver ICs arranged in a number of rows other than three may also be transmitted.

In addition, although it has been described above that the same row is one group, the disclosure is not limited thereto. In the example described above, for example, n may be divided into five groups, and the above operation may be performed for each group.

In addition, although the first row is described as the first line in the above, the first line may be any outer line such as a first column, a last row, or a last column. If the first line is an outer line other than the first row, only the signal transmission direction is changed and the rest are the same, so a redundant description will be omitted.

Hereinafter, the operation of the disclosure will be described in more detail with reference to various drawings. In the following drawings, each embodiment may be implemented individually or may be implemented in a combined form.

Figure 3:
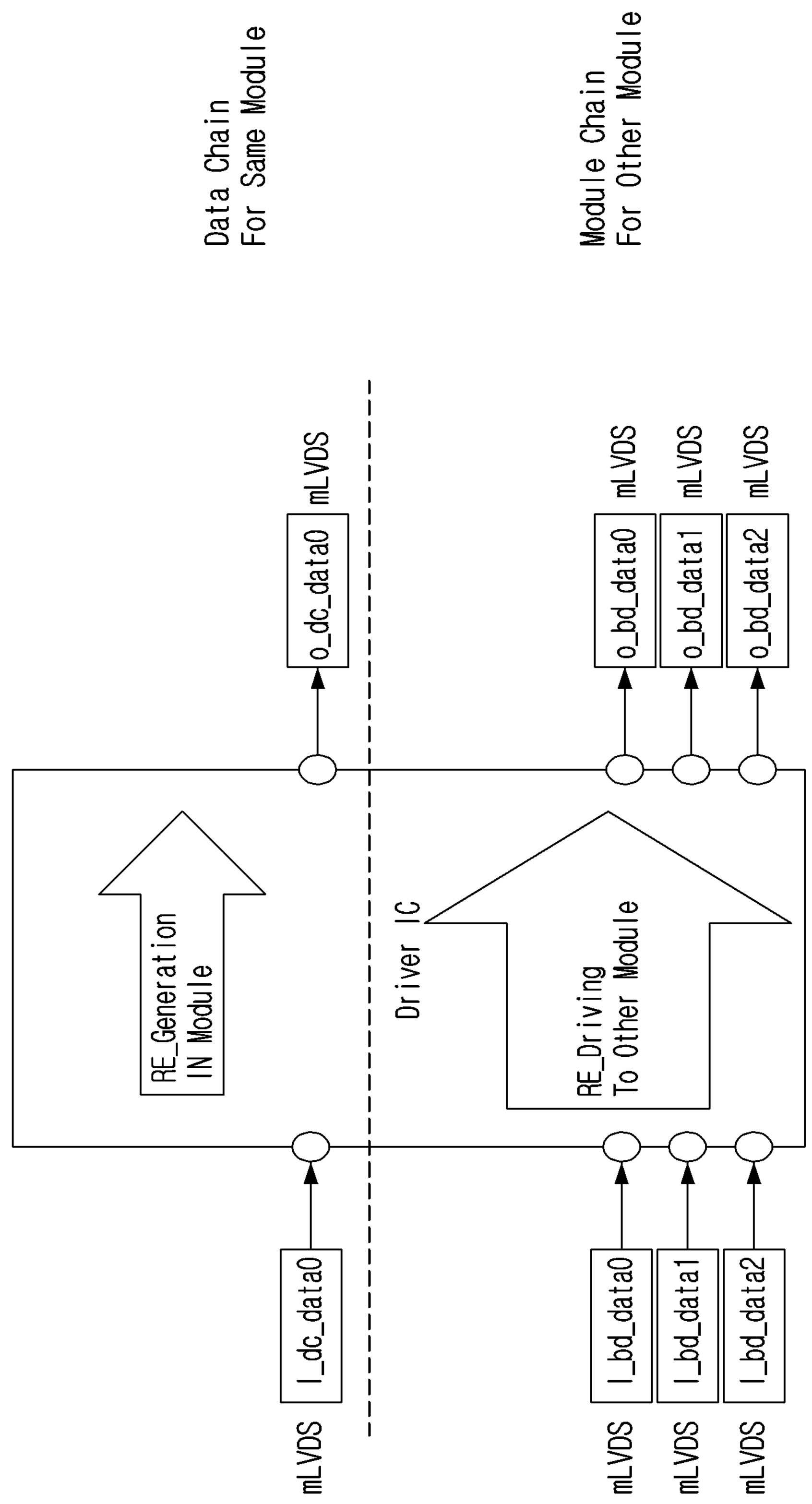
FIG. 3 is a view illustrating an operation of a driver IC according to an embodiment of the disclosure.

FIG. 3 is a view illustrating an operation of a driver IC according to an embodiment of the disclosure.

First, the driver IC according to the disclosure may output one hundred and twenty (120) or more channels and sixty (60) or more scan lines. Accordingly, even if a display device having the same resolution is implemented, the number of driver ICs may be reduced compared with the related art.

The driver IC may include at least one interface of mini LVDS, LVDS, VbyOne, SerDes, or USI-T. In particular, the driver IC may perform two types of data communication through a high-speed interface.

For convenience of description, it is assumed that a plurality of LED modules 110 are arranged in a matrix form of m×n, and a plurality of driver ICs 120 are respectively arranged at the rear of the plurality of LED modules 110. In addition, it is assumed that a first row is a first line, and four continuous LED modules in the same row will be described as one group.

A plurality of driver ICs included in one group may provide signals in a data daisy chain method. That is, each of the plurality of driver ICs may provide signals other than a control signal necessary for each driver IC to an adjacent driver IC.

A control signal may be provided between adjacent groups through a re-driving function, that is, a repeater function. That is, the driver IC may provide a control signal corresponding to a next group to the next group.

Figure 4:
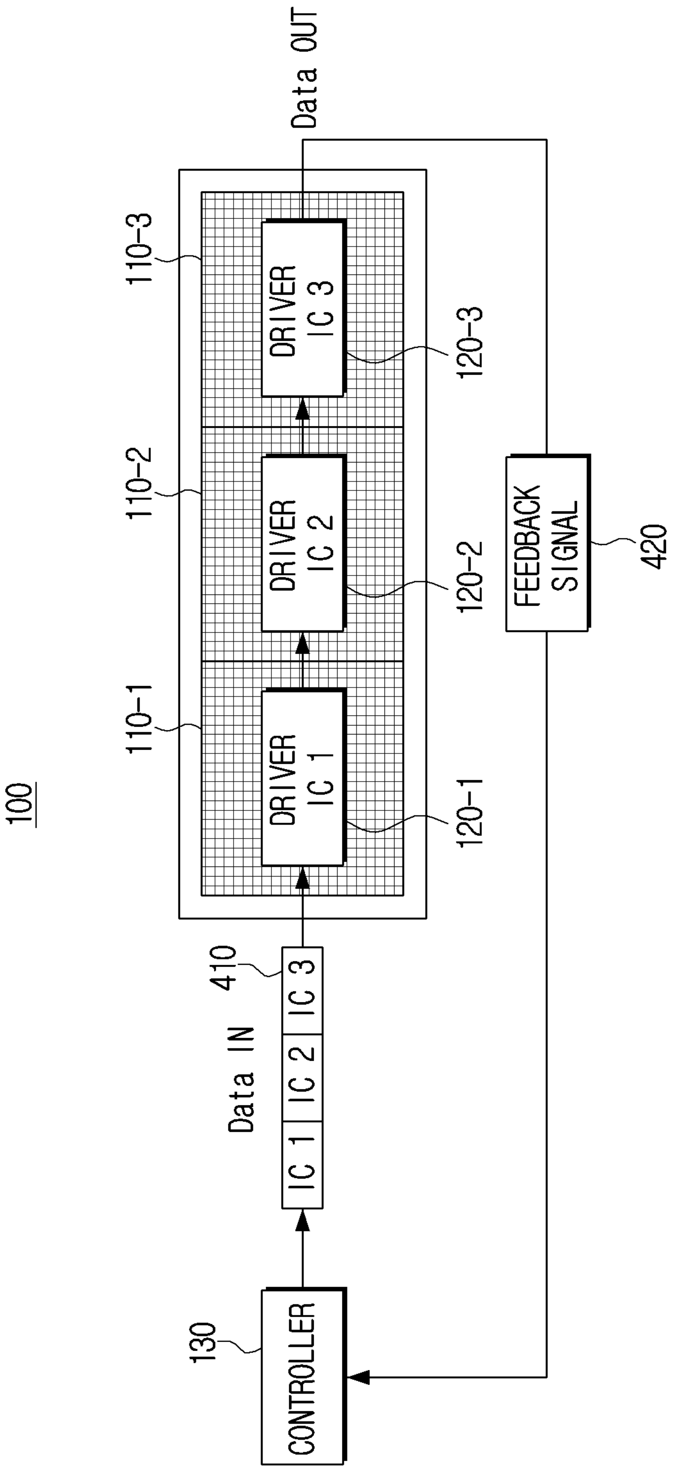
FIG. 4 is a view illustrating signal transmission within a group according to an embodiment of the disclosure.

FIG. 4 is a view illustrating signal transmission within a group according to an embodiment of the disclosure.

In FIG. 4, three LED modules 110-1, 110-2, and 110-3 and three driver ICs 120-1, 120-2, and 120-3 respectively connected to the three LED modules 110-1, 110-2, and 110-3, respectively, are assumed.

The controller 130 may sequentially transmit image data 410 to each of the corresponding three driver ICs 120-1, 120-2, and 120-3 based on an arrangement order of the three driver ICs 120-1, 120-2, and 120-3.

Here, image data corresponding to the driver IC 1 120-1 is described as IC 1 data, image data corresponding to the driver IC 2 120-2 is described as IC 2 data, and image data corresponding to the driver IC 3 120-3 is described as IC 3 data.

The three driver ICs 120-1, 120-2, and 120-3 are arranged in the order of driver IC 1 120-1, driver IC 2 120-2, and driver IC 3 120-3. Accordingly, the controller 130 may transmit IC 3 data first, transmit IC 2 data secondly, and transmit IC 3 data last, based on the arrangement. The image data 410 may be input to each of the driver ICs 120-1, 120-2, and 120-3 through the driver IC 1 120-1 disposed first. Accordingly, the respective image data 410 may arrive at the corresponding driver ICs 120-1, 120-2, and 120-3 together.

Each of the three LED modules 110-1, 110-2, and 110-3 copies the image data 410, stores the image data 410 in an internal buffer, and then outputs the image data, and the image data 410 may be discharged through the third LED module 110-3 disposed at the end, among the three LED modules 110-1, 110-2, and 110-3. A feedback signal 420 including the discharged image data 410 may be transmitted to the controller 130. However, the disclosure is not limited thereto, and the controller 130 may not receive the image data 410 included in the feedback signal 420.

Figure 5:
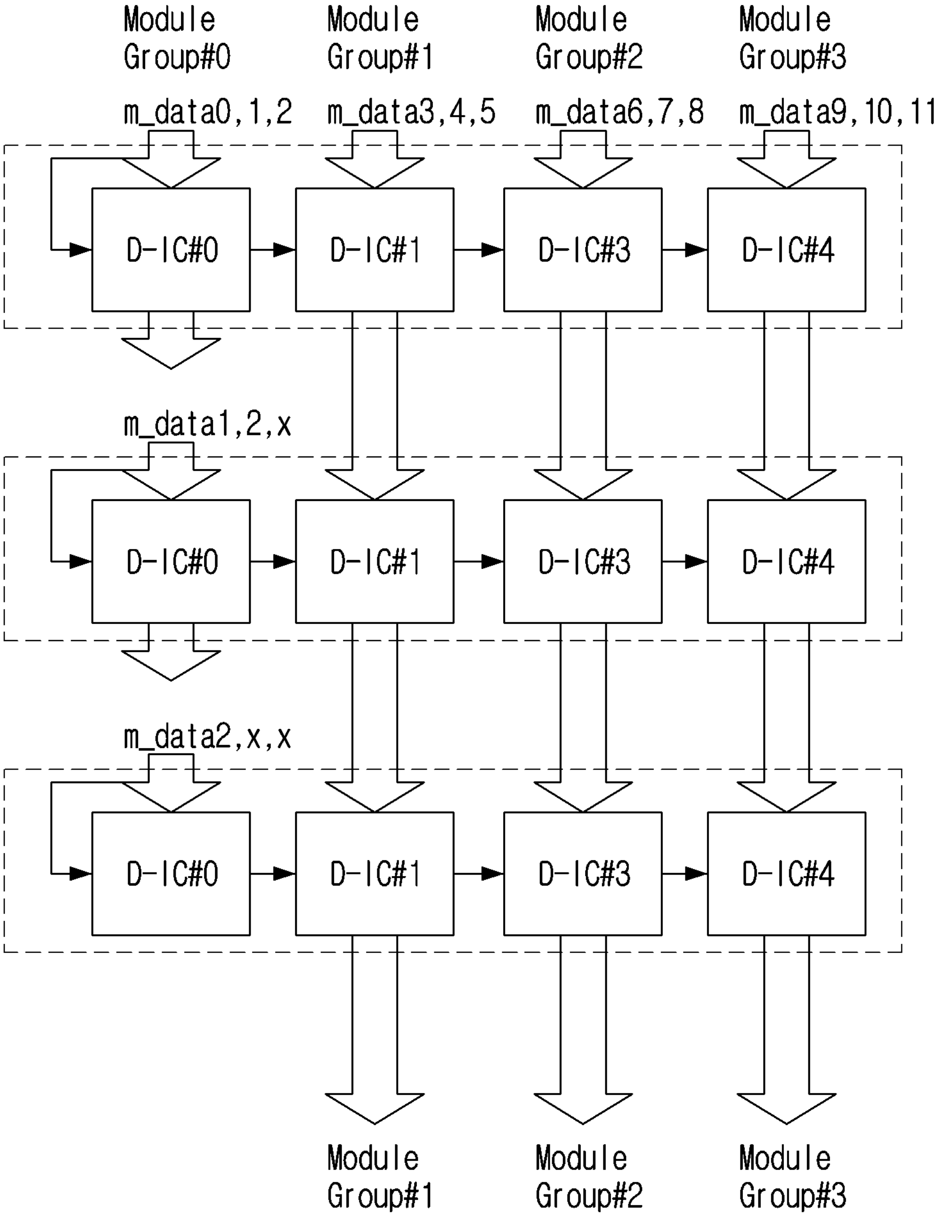
FIG. 5 is a view illustrating signal transmission between groups according to an embodiment of the disclosure.

FIG. 5 is a view illustrating signal transmission between groups according to an embodiment of the disclosure.

As shown in FIG. 5, a driver IC in a first column of a first row may receive a control signal for controlling a group (module group #0) in the first to third rows. The driver IC in the first column of the first row may transmit a control signal for controlling the group of the first row within the group in the manner as shown in FIG. 4 and may provide a remaining signal to a driver IC in the first column of the second row.

The driver IC in the first column of the second row may transmit a control signal for controlling a group of the second row within the group in the manner as shown in FIG. 4, and provide a remaining signal to the driver IC in the first column of the third row. The driver IC in the first column of the third row may transmit the received control signal within the group in the manner as shown in FIG. 4.

The driver ICs in the second column of the first row may receive a control signal for controlling a group (module group #1) in the fourth to sixth rows. The driver IC in the second column of the first row identifies that the received control signal does not include a control signal for controlling the group of the first row, and may provide the received control signal to the driver IC in the second column of the second row. The driver IC of in second column of the second row may identify that the received control signal does not include a control signal for controlling the group of the second row, and may provide the received control signal to a driver IC in the second column of the third row. The driver IC in the second column of the third row may identify that the received control signal does not include a control signal for controlling the group in the third row, and may provide the received control signal to a driver IC in a first column of the fourth row. That is, the driver IC in the second column of the third row may be connected to the driver IC in the first column of the fourth row, and through this connection, there is a shift effect. The driver IC in the first column of the fourth row may transmit a control signal for controlling a group of the fourth row within the group in the manner as shown in FIG. 4, and may provide a remaining signal to the driver IC in the first column of the fifth row.

The driver ICs in the third column of the first row may receive a control signal for controlling a group (module group #2) in the seventh to ninth rows. The driver IC in the third column of the first row identifies that the received control signal does not include a control signal for controlling the group in the first row, and provides the received control signal to the driver IC in the third column of the second row, and the driver IC in the third column of the second row and the driver IC in the third column of the third row may operate in the same manner and a control signal may be transmitted to the driver IC in the second column of the fourth row.

The driver IC of the second column of the fourth row identifies that the received control signal does not include a control signal for controlling the group of the fourth row and provides the received control signal to the driver IC in the second column of the fifth row, and the driver IC in the second column of the fifth row and the driver IC in the second column of the sixth row may operate in the same manner to transmit a control signal to the driver IC in the first column of the seventh row.

The driver IC in the first column of the seventh row transmits a control signal for controlling the group in the seventh row in the received signal within the group in the manner as shown in FIG. 4, and may provide a remaining signal to the driver IC in the first column of the eighth row.

While the control signal is transmitted to all of the plurality of driver ICs in the above manner, the controller 130 may be connected only to the plurality of driver ICs arranged on the first line.

In FIG. 5, it is assumed that four driver ICs are provided in one row and control signals for three rows are transmitted, but this is only an example and various implementations may be provided.

In addition, it is assumed that the driver IC in the first row is connected to the controller 130, but this may also be changed as described above.

Figure 6:
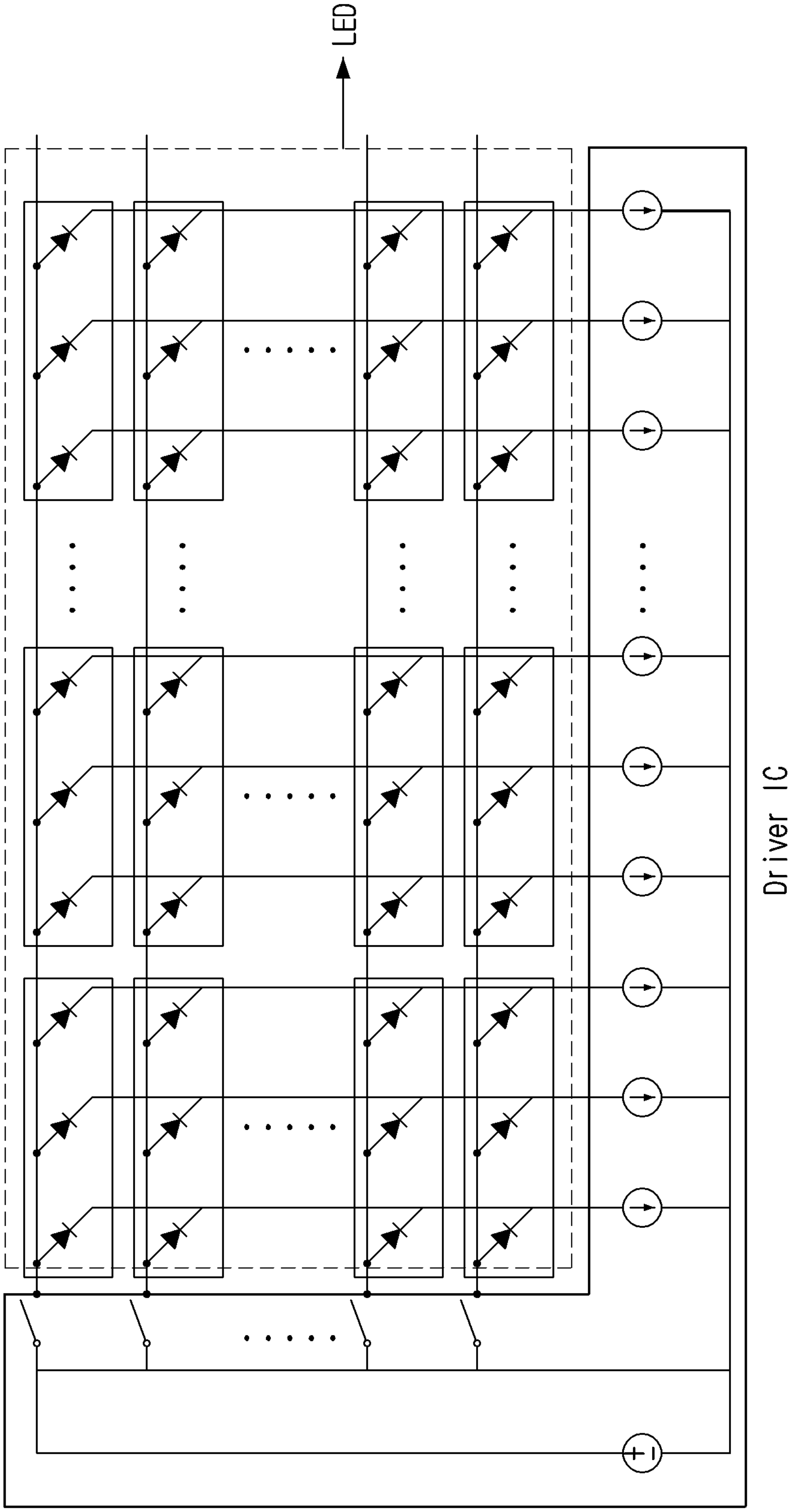
FIG. 6 is a view illustrating an LED module operating according to a high-speed interface of a driver IC according to an embodiment of the disclosure.

FIG. 6 is a view illustrating an LED module operating according to a high-speed interface of a driver IC according to an embodiment of the disclosure.

Each of the plurality of driver ICs may include at least one interface, among mini LVDS, LVDS, VbyOne, SerDes, and USI-T, and may output one hundred and twenty (120) or more channels and sixty (60) or more scan lines according to a high-speed interface. That is, as shown in FIG. 6, the number of pixels that one driver IC may control may increase.

Therefore, even when the display device 100 of the same resolution is implemented, according to the disclosure, the number of driver ICs may be reduced compared with the related art, and the connection between the plurality of driver ICs 120 and the controller 130 may be reduced, thereby reducing the size and manufacturing cost.

Figure 7A:
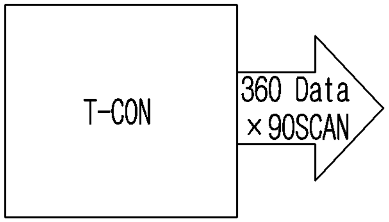
FIGS. 7A and 7B are views illustrating a channel bundle structure according to embodiments of the disclosure.
Figure 7A:
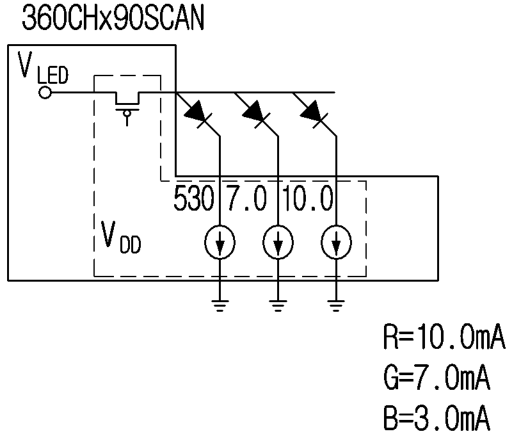
Figure 7B:
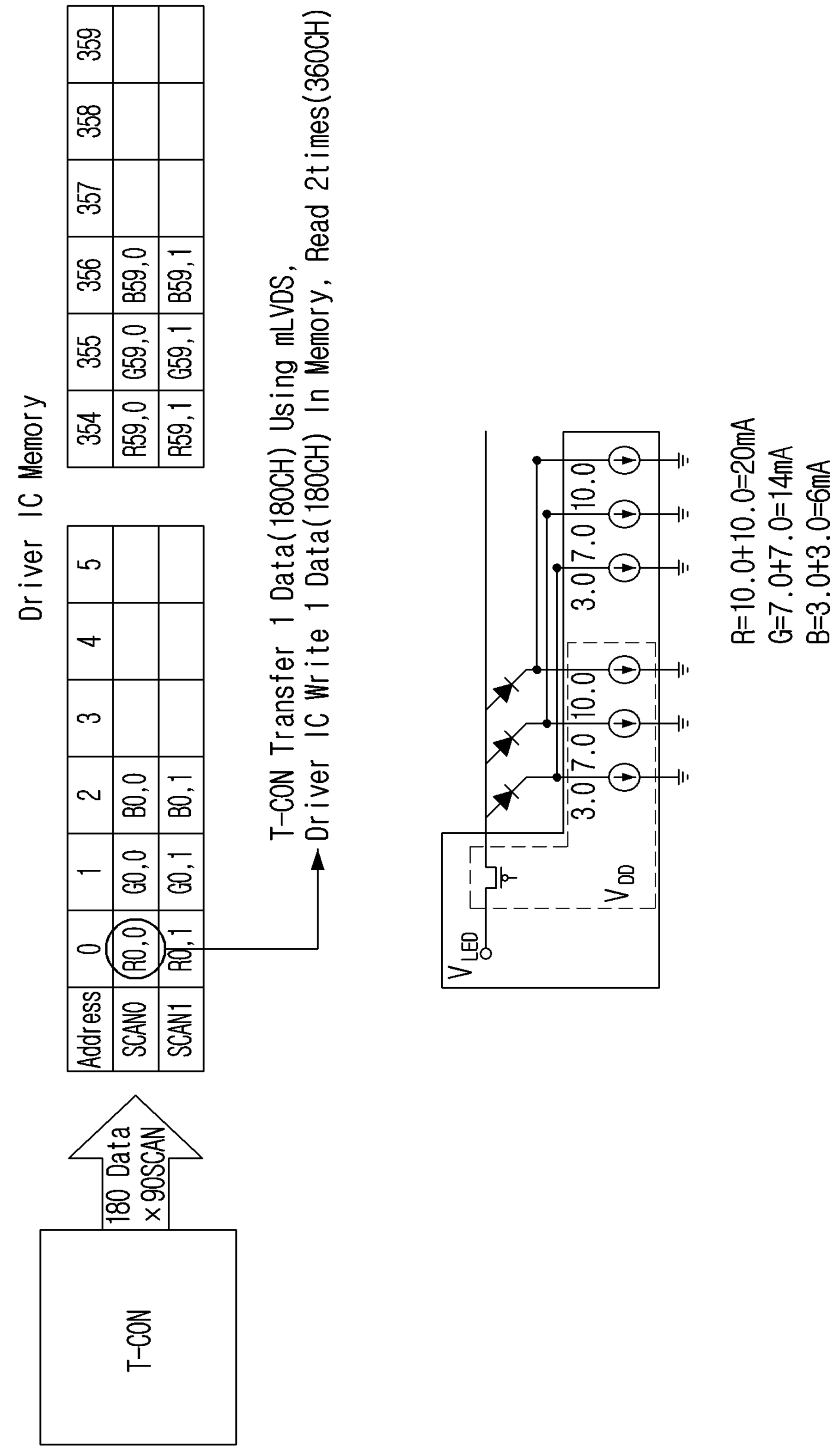

FIGS. 7A and 7B are diagrams illustrating a channel bundle structure according to an embodiment of the disclosure.

When FIG. 7A is changed to the channel bundle structure as shown in FIG. 7B, an output current specification may be doubled. For example, a driver IC capable of outputting 360 channels×90 scan lines operates with an output of 180 channels×90 scan lines through the channel bundle structure. Accordingly, the number of high-speed interfaces may be reduced.

Figure 8:
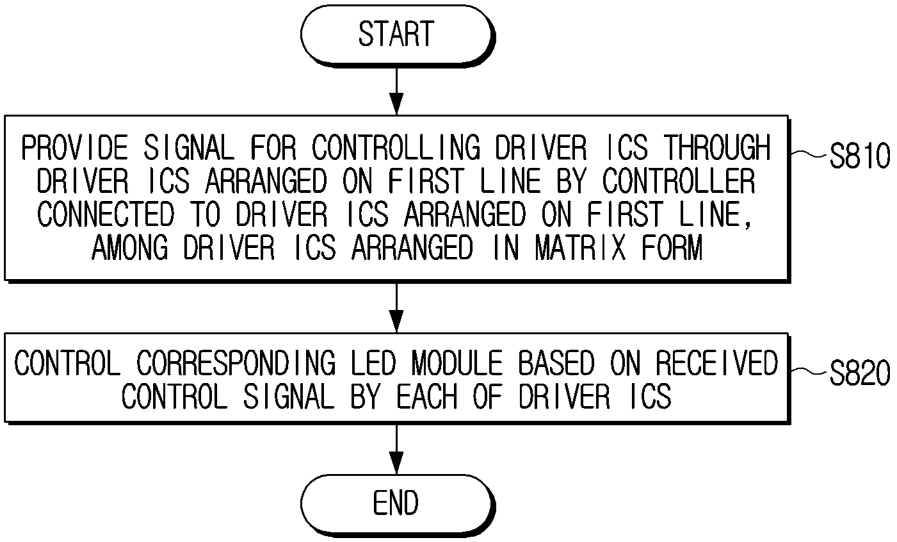
FIG. 8 is a flowchart illustrating a method of controlling a display device according to an embodiment of the disclosure.

FIG. 8 is a flowchart illustrating a method of controlling a display device according to an embodiment of the disclosure.

First, a controller connected to a plurality of driver ICs arranged on a first line, among a plurality of driver ICs arranged in a matrix form, provides a signal for controlling the plurality of driver ICs through the plurality of driver ICs arranged on the first line (S810). Then, each of the plurality of driver ICs controls a corresponding LED module based on the received control signal (S820). Here, each of the plurality of driver ICs may be connected to at least one of the adjacent driver ICs, and the signal for controlling each of the plurality of driver ICs may include a channel signal for controlling each channel of the LED module corresponding to each of the plurality of driver ICs and a scan signal for controlling each scan line of the LED module corresponding to each of the driver ICs.

Here, in the step of providing (S810), a plurality of control signals for controlling a plurality of driver ICs arranged on a plurality of lines including the first line may be provided to a first driver IC, among a plurality of driver ICs arranged on the first line.

Also, in the step of providing (S810), the first driver IC may provide the remaining signals excluding the first control signal for controlling the first line, among the plurality of control signals, to the second driver IC adjacent to the first driver IC on the second line next to the first line, among the plurality of lines.

In addition, in the step of providing (S810), the first driver IC may control the LED module corresponding to the first driver IC based on the control signal corresponding to the first driver IC, among the first control signals, and may provide the remaining signals, among the first control signals, to a third driver IC adjacent to the first driver on the first line.

In addition, the method may further include receiving a feedback signal from one of a plurality of driver ICs arranged on the first line.

In the step of providing (S810), a plurality of control signals for controlling a plurality of driver ICs arranged on a plurality of lines not including the first line may be provided to a third driver IC, among a plurality of driver ICs arranged on the first line.

Here, the plurality of control signals may be sequentially provided from the third driver IC to at least some of the remaining lines, and while being sequentially provided, the plurality of control signals may be provided to the fourth driver IC corresponding to the third driver IC or the fifth driver IC adjacent to the fourth driver IC on the same line as the fourth driver IC.

In addition, in the step of providing (S810), when the fifth driver IC is disposed at a position corresponding to the first driver IC, an LED module corresponding to the fifth driver IC may be controlled based on the control signal corresponding to the fifth driver IC, and when the fifth driver IC is not disposed at a position corresponding to the first driver IC, a plurality of control signals may be provided to a driver IC corresponding to the fifth driver IC on a next line of the line including the fifth driver IC.

Each of the plurality of LED modules may include one hundred and twenty (120) or more channels and sixty (60) or more scan lines.

In addition, each of the plurality of driver ICs may include at least one interface, among mini LVDS, LVDS, VbyOne, SerDes, and USI-T.

According to various embodiments of the disclosure as described above, as the display device uses a driver IC having a high-speed interface, the number and connection of the driver ICs may be minimized to reduce material costs.

In addition, the controller of the display device may be connected to only some of the driver ICs to provide a control signal, and the control signal may be sequentially provided to the other driver ICs, thereby further reducing the size of the display device.

In addition, as the driver IC having a high-speed interface is used, the number of LEDs that may be managed by one driver IC increases, so that a product with a small pitch between LEDs may be implemented.

According to an example embodiment of the disclosure, the various example embodiments described above may be implemented by software including instructions that are stored in a machine (e.g. a computer) readable storage medium. The machine, which is a device capable of calling the instruction stored in the storage medium and operating according to the called instruction, may include an electronic device (e.g. an electronic device A) according to the embodiments described above. In an example in which the instructions are executed by a processor, a function corresponding to the instructions may be performed directly by the processor or using other components under the control of the processor. The instruction may include a code generated by a compiler or a code executable by an interpreter. The machine-readable storage medium may be provided in the form of a non-transitory storage medium. The 'non-transitory' storage medium is tangible, and it does not limit the storage medium to mean that data is stored semi-permanently or temporarily thereon.

Also, according to an embodiment of the disclosure, the method according to the various embodiments described above may be included and provided in a computer program product. The computer program product may be traded as a product between a seller and a buyer. The computer program product may be distributed in the form of a machine-readable storage medium (e.g. a compact disc read only memory (CD-ROM)) or online via an application store (e.g. Play Store™). In case of on-line distribution, at least a part of the computer program product may be at least temporarily stored in a storage medium such as a memory of a server of a manufacturer, a server of an application store, or a relay server, or be temporarily generated.

Various embodiments described above may be implemented in a computer or similar device-readable recording medium using software, hardware, or a combination thereof. In some cases, embodiments described in this disclosure may be implemented by the processor itself. In case of software implementation, embodiments such as procedures and functions described in this disclosure may be implemented as separate software modules. Each of the software modules may perform one or more functions and operations described in this disclosure.

Computer instructions for performing the processing operation of the device according to the various embodiments described above may be stored in a non-transitory computer-readable medium. When the computer instructions stored in the non-transitory computer-readable medium are executed by the processor of the specific device, the specific device performs the processing operation in the device according to the various embodiments described above. The non-transitory computer-readable medium refers to a medium that stores data semi-permanently, rather than a medium that stores data for a short moment, such as a register, a cache, a memory, and the like, and may be read by a device. Specific examples of the non-transitory computer-readable medium may include a CD, DVD, hard disk, Blu-ray disk, USB, memory card, ROM, and the like.

Each component (e.g., the module or the program) according to various embodiments may include at least one of the above components, and a portion of the above sub-components may be omitted, or other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

While embodiments of the disclosure have been described, the disclosure is not limited to the above-described specific embodiments, and it will be understood by those skilled in the related art that various modifications and variations may be made without departing from the scope of the disclosure as defined by the appended claims, as well as these modifications and variations should not be understood separately from the technical spirit and prospect of the disclosure.

What is claimed is:

1. A display device comprising:

a plurality of light emitting diode (LED) modules arranged in a matrix having a plurality of lines;

a plurality of driver integrated circuits (ICs) configured to drive the plurality of LED modules; and a controller connected to a plurality of first line driver ICs arranged on a first line of the plurality of lines, among the plurality of driver ICs, and configured to provide a plurality of control signals for controlling the plurality of driver ICs through the plurality of first line driver ICs, wherein each of the plurality of driver ICs is connected to at least one same-line adjacent driver IC on a same line of the plurality of lines to thereby define a same-line signal path, and at least one different-line adjacent driver IC on an adjacent line of the plurality of lines to thereby define a cross-line signal path different from the same-line signal path, wherein each control signal of the plurality of control signals corresponds to a driver IC of the plurality of driver ICs, and comprises, for each LED module corresponding to the driver IC which corresponds to the control signal:

a channel signal for controlling each channel of the LED module, and a scan signal for controlling each scan line of the LED module, wherein at least one of the plurality of driver ICs is connected to the at least one different-line adjacent driver IC on an adjacent line of the plurality of lines in a diagonal direction, wherein the controller is further configured to:

provide a plurality of control signals for controlling a first set of driver ICs arranged on a plurality of lines comprising the first line to a first driver IC of the plurality of first line driver ICs, provide a plurality of control signals for controlling a second set of driver ICs arranged on a plurality of lines not comprising the first line to a third driver IC of the plurality of first line driver ICs, wherein the plurality of control signals for controlling the second set of driver ICs is transmitted through the third driver IC and a driver IC disposed at a position corresponding to a position of the third driver IC in the plurality of lines comprising the first line, and is transmitted through a driver IC disposed adjacent to the position corresponding to the position of the third driver IC in the plurality of lines not comprising the first line, and wherein a line located furthest from the first line among the plurality of lines comprising the first line is adjacent to one of the plurality of lines in the plurality of lines not comprising the first line.

2. The display device of claim 1, wherein the plurality of control signals comprises a first control signal for controlling the first driver IC and at least one second line control signal for controlling a driver IC on a second line adjacent to the first line, among the plurality of lines; and wherein the first driver IC is configured to provide the at least one second line control signal by the cross-line signal path of the first driver IC to a second driver IC adjacent to the first driver IC and arranged on the second line, the second driver IC being a different-line adjacent driver IC of the first driver IC.

3. The display device of claim 2, wherein the plurality of control signals further comprises a plurality of first line control signals for controlling a driver IC on the first line among the plurality of lines, the plurality of first line control signals comprising the first control signal, and wherein the first driver IC is configured to control an LED module corresponding to the first driver IC based on the first control signal, and to provide a remainder of the plurality of first line control signals by the same-line signal path of the first driver IC to a third driver IC adjacent to the first driver IC in the first line, the third driver IC being a same-line adjacent driver IC of the first driver IC.

4. The display device of claim 2, wherein the controller is further configured to receive a feedback signal from one of the plurality of first line driver ICs.

5. The display device of claim 1, wherein each of the plurality of LED modules comprises at least 120 channels and at least 60 scan lines.

6. The display device of claim 1, wherein each of the plurality of driver ICs comprises at least one interface, each of the at least one interface being one of a mini LVDS, LVDS, VbyOne, SerDes, and USI-T.

7. A method of controlling a display device, the method comprising:

providing a plurality of control signals for controlling a plurality of driver integrated circuits (ICs) arranged in a matrix through a plurality of first line driver ICs arranged on a first line of a plurality of lines of the matrix, by a controller connected to the plurality of first line driver ICs; and controlling each of a plurality of light emitting diode (LED) modules based on a control signal, of the plurality of control signals, respectively received by a corresponding one of the plurality of driver ICs, wherein each of the plurality of driver ICs is connected to at least one same-line adjacent driver IC on a same line of the plurality of lines to thereby define a same-line signal path, and at least one different-line adjacent driver IC on an adjacent line of the plurality of lines to thereby define a cross-line signal path different from the same-line signal path, wherein each control signal of the plurality of control signals corresponds to a driver IC of the plurality of driver ICs, and comprises, for each LED module corresponding to the driver IC which corresponds to the control signal:

a channel signal for controlling each channel of an LED module, and a scan signal for controlling each scan line of the LED module, wherein at least one of the plurality of driver ICs is connected to the at least one different-line adjacent driver IC on an adjacent line of the plurality of lines in a diagonal direction, wherein the providing comprises:

providing a plurality of control signals for controlling a first set of driver ICs arranged on a plurality of lines comprising the first line to a first driver IC of the plurality of first line driver ICs, providing a plurality of control signals for controlling a second set of driver ICs arranged on a plurality of lines not comprising the first line to a third driver IC of the plurality of first line driver ICs, wherein the plurality of control signals for controlling the second set of driver ICs is transmitted through the third driver IC and a driver IC disposed at a position corresponding to a position of the third driver IC in the plurality of lines comprising the first line, and is transmitted through a driver IC disposed adjacent to the position corresponding to the position of the third driver IC in the plurality of lines not comprising the first line, and wherein a line located furthest from the first line among the plurality of lines comprising the first line is adjacent to one of the plurality of lines in the plurality of lines not comprising the first line.

8. The method of claim 7, wherein the plurality of control signals comprises a first control signal for controlling the first driver IC and at least one second line control signal for controlling a driver IC on a second line adjacent to the first line, among the plurality of lines; and wherein the providing the plurality of control signals comprises providing, by the first driver IC, the at least one second line control signal by the cross-line signal path of the first driver IC to a second driver IC adjacent to the first driver IC and arranged on the second line, the second driver IC being a different-line adjacent driver IC of the first driver IC.

9. The method of claim 8, wherein the plurality of control signals further comprises a plurality of first line control signals for controlling a driver IC on the first line among the plurality of lines, the plurality of first line control signals comprising the first control signal, and wherein the providing the plurality of control signals further comprises:

controlling, by the first driver IC, an LED module corresponding to the first driver IC based on the first control signal, and providing a remainder of the plurality of first line control signals by the same-line signal path of the first driver IC to a third driver IC adjacent to the first driver IC in the first line, the third driver IC being a same-line adjacent driver IC of the first driver IC.

10. The method of claim 8, further comprising:

receiving a feedback signal from one of the plurality of first line driver ICs.

11. A display device comprising:

a plurality of light emitting diode (LED) modules arranged in a matrix;

a plurality of driver integrated circuits (ICs) configured to drive the plurality of LED modules; and a controller connected to a plurality of first line driver ICs arranged on a first line, among the plurality of driver ICs, and configured to provide a signal for controlling the plurality of driver ICs through the plurality of first line driver ICs, wherein each of the plurality of driver ICs is connected to at least one adjacent driver IC, wherein the signal for controlling the plurality of driver ICs comprises, for each LED module corresponding to each of the plurality of driver ICs:

a channel signal for controlling each channel of the LED module, and a scan signal for controlling each scan line of the LED module, wherein the controller is further configured to provide a plurality of control signals for controlling a set of driver ICs arranged on a plurality of remaining lines other than the first line to a third driver IC of the plurality of first line driver ICs, wherein the plurality of control signals are sequentially provided from the third driver IC to at least one line of the plurality of remaining lines, wherein, while being sequentially provided, the plurality of control signals are provided, based on a quantity of the plurality of control signals, to one of:

a fourth driver IC corresponding to the third driver IC, and a fifth driver IC adjacent to the fourth driver IC on the same line as the fourth driver IC, wherein a first driver IC of the plurality of first line driver ICs is adjacent to the third driver IC in the first line, wherein, when the fifth driver IC is disposed at a position corresponding to the first driver IC, the fifth driver IC controls an LED module corresponding to the fifth driver IC based on a control signal corresponding to the fifth driver IC, among the plurality of control signals, and wherein, when the fifth driver IC is not disposed at the position corresponding to the first driver IC, the fifth driver IC provides the plurality of control signals to a driver IC corresponding to the fifth driver IC on a line next to the line in which the fifth driver IC is included.

* * * * *